US012099469B2

United States Patent
Peng et al.

(10) Patent No.: US 12,099,469 B2
(45) Date of Patent: Sep. 24, 2024

(54) LOW-MEMORY AND EFFICIENT HASHMAP

(71) Applicant: SAP SE, Walldorf (DE)

(72) Inventors: Rufeng Peng, Shanghai (CN); Jia Feng, Pleasanton, CA (US); Na Zhang, Shanghai (CN); Kun Hu, Shanghai (CN); Yijin Hu, Shanghai (CN); Fangling Liu, Shanghai (CN); You Li, Shanghai (CN); Yuna Hou, Shanghai (CN)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 17/819,964

(22) Filed: Aug. 16, 2022

(65) Prior Publication Data

US 2024/0061808 A1 Feb. 22, 2024

(51) Int. Cl.
*G06F 16/00* (2019.01)
*G06F 16/13* (2019.01)
(52) U.S. Cl.
CPC .................................. *G06F 16/137* (2019.01)
(58) Field of Classification Search
CPC ..... G06F 16/137; G06F 16/2237–2264; G06F 16/9014; G06F 16/2255
See application file for complete search history.

(56) References Cited

U.S. PATENT DOCUMENTS

| | | | |
|---|---|---|---|
| 7,619,623 B2 | 11/2009 | Hoppe et al. | |
| 10,255,174 B2 | 4/2019 | Liu et al. | |
| 10,404,825 B2 | 9/2019 | Feng et al. | |
| 10,484,234 B1 | 11/2019 | Sun et al. | |
| 10,911,447 B2 | 2/2021 | Coffey et al. | |
| 2017/0170968 A1* | 6/2017 | Zhang | H04L 63/061 |
| 2021/0318834 A1 | 10/2021 | Kandiyanallur et al. | |

OTHER PUBLICATIONS

Nimbe et al., "Hash Table Collision Resolution Using a Multi-Dimensional Array" International Journal of Innovation and Scientific Research, vol. 9 No. 2, Sep. 2014, 10 pages.

* cited by examiner

*Primary Examiner* — Tyler J Torgrimson
(74) *Attorney, Agent, or Firm* — Fish & Richardson P.C.

(57) ABSTRACT

Methods, systems, and computer-readable storage media for receiving a key and a value of a data object, determining a first identifier and a second identifier based on the key, defining an entry object including the first identifier, the second identifier, and the value, and storing the entry object in a hashmap by: determining a first value of a first index based on the first identifier, determining a second value of a second index to provide a first value and second value pair that defines a first location within the hashmap storing the first identifier, determining a third value of a third index for the first value and second value pair, where the first value, the second value, and the third value define a second location within the hashmap storing the second identifier, and storing the value at a third location within the hashmap.

20 Claims, 10 Drawing Sheets

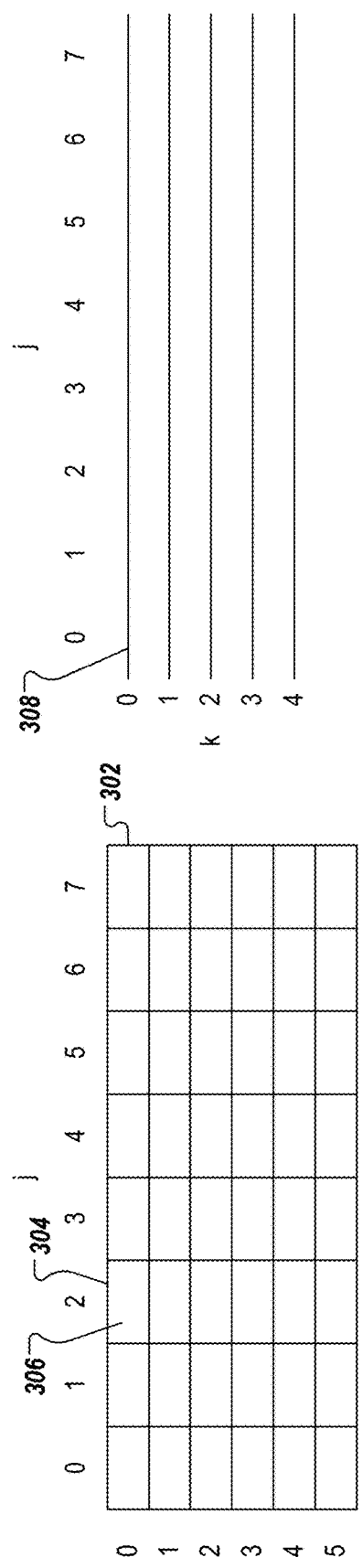
FIG. 3B
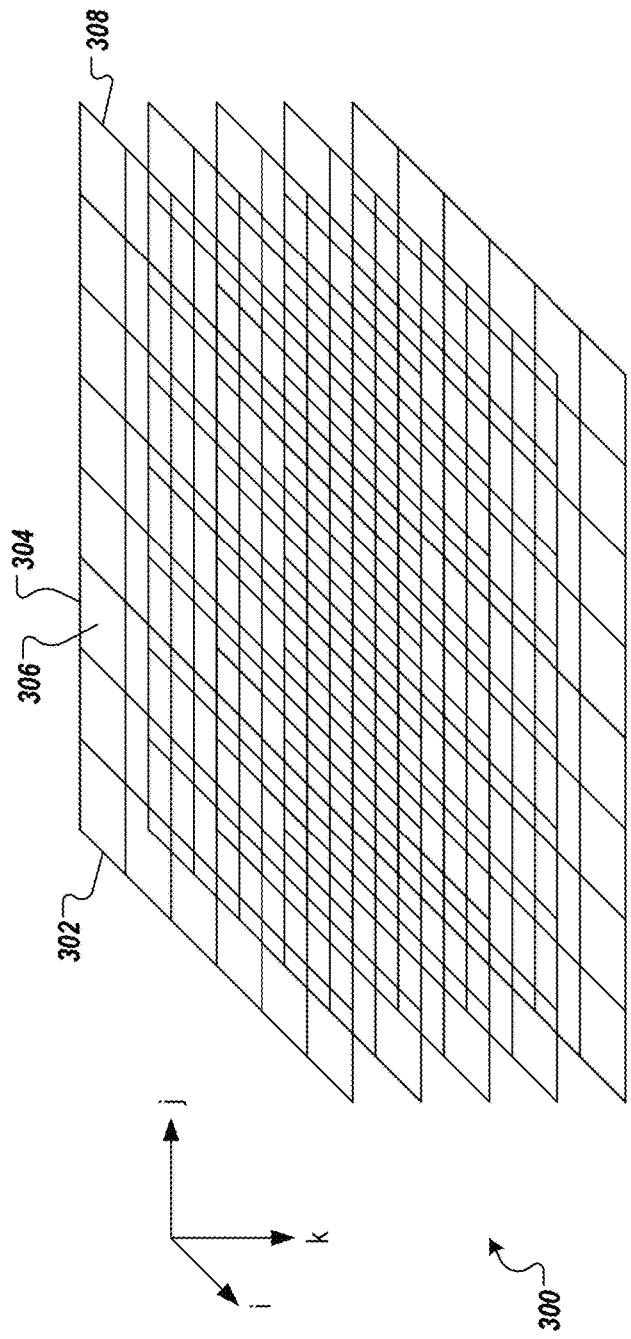
FIG. 3C
FIG. 3A

LOW-MEMORY AND EFFICIENT HASHMAP

BACKGROUND

Computer-executable applications can process data to perform functionality. In some instances, data is repeatedly accessed by an application at relatively high frequency. Such data should be stored in a data structure that enables relatively fast reading and/or writing of the data by the application. In computing systems, hash maps can be described as a data storage structure used for resource-efficient retrieval of information and are commonly used for data that is to be repeatedly accessed by applications at relatively high frequencies. As a data storage structure, hash maps can require a relatively large memory footprint, particularly in instances of larger volumes of data being stored in a hash map.

SUMMARY

Implementations of the present disclosure are directed to a low-memory, high-efficiency hash map. More particularly, implementations of the present disclosure are directed to a hash map provided as a multi-dimensional data structure that provides memory-efficient storage of entry objects.

In some implementations, actions include receiving a key and a value of a data object in a set of data objects, determining a first identifier and a second identifier of the data object based on the key, defining an entry object for the data object, the entry object including the first identifier, the second identifier, and the value of the data object, and storing the entry object in the hashmap by: determining a first value of a first index based on the first identifier, determining a second value of a second index to provide a first value and second value pair that at least partially defines a first location within the hashmap storing the first identifier, determining a third value of a third index for the first value and second value pair, where the first value, the second value, and the third value define a second location within the hashmap storing the second identifier, and storing the value at a third location within the hashmap, the third location being defined by the first value, the second value, and an increment of the third value. Other implementations of this aspect include corresponding systems, apparatus, and computer programs, configured to perform the actions of the methods, encoded on computer storage devices.

These and other implementations can each optionally include one or more of the following features: the first identifier is determined by processing the key through a first hash function and the second identifier is determined by processing the key through a second hash function, the first hash function different from the second hash function; the second index includes an array in a dimension of the third index, and SIDs are stored at odd locations and values are stored at even locations along the dimension, excluding an initial location of the third index; the first location within the hashmap storing the first identifier is defined by a tuple including the first value, the second value, and an initial value of the third index; actions further include reading the value of the data object from computer-readable memory by receiving the key of the data object, calculating the first identifier and the second identifier based on the key, determining the third location based on the first identifier and the second identifier, and reading the value from the third location; the increment of the third value is determined by incrementing the third value by 1; a size of the first index is determined by providing an initial array size, dividing the initial array size in half, and subtracting one to provide the size of the first index; and, after writing entry objects of all data objects in the set of data objects to the hashmap, the hashmap is immutably stored in computer-readable memory.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3C depict an example visual representation of a low-memory, efficient hashmap in accordance with implementations of the present disclosure.

Like reference symbols in the various drawings indicate like elements.

DETAILED DESCRIPTION

Implementations of the present disclosure are directed to a low-memory, high-efficiency hash map. More particularly, implementations of the present disclosure are directed to a hash map provided as a multi-dimensional data structure that provides memory-efficient storage of entry objects. Implementations can include actions of receiving a key and a value of a data object in a set of data objects, determining a first identifier and a second identifier of the data object based on the key, defining an entry object for the data object, the entry object including the first identifier, the second identifier, and the value of the data object, and storing the entry object in the hashmap by: determining a first value of a first index based on the first identifier, determining a second value of a second index to provide a first value and second value pair that at least partially defines a first location within the hashmap storing the first identifier, determining a third value of a third index for the first value and second value pair, where the first value, the second value, and the third value define a second location within the hashmap storing the second identifier, and storing the value at a third location within the hashmap, the third location being defined by the first value, the second value, and an increment of the third value.

Figure 1:
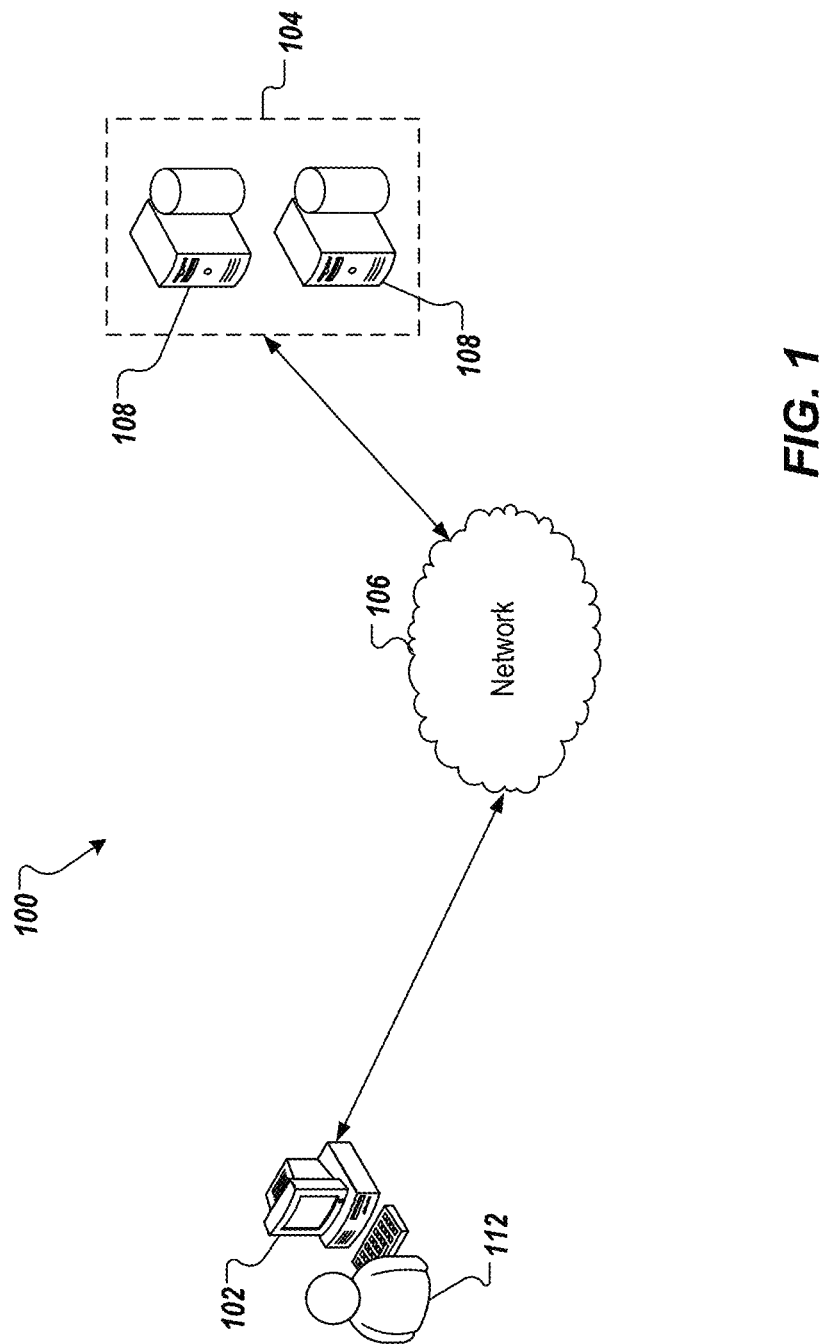
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host one or more applications that selectively access data stored in memory. In some examples, data can be accessed at relatively high frequencies. As described herein, one or more applications can access data using the low-memory, high-efficiency hash map of the present disclosure, which can be maintained within the server system 104, or elsewhere.

To provide further context for implementations of the present disclosure, and as introduced above, computer-executable applications can process data to perform functionality. In some instances, data is repeatedly accessed by an application at relatively high frequency. Such data should be stored in a data structure that enables relatively fast reading and/or writing of the data by the application.

In computing systems, hash maps (referred to herein as hashmaps) can be described as a data storage structure used for resource-efficient retrieval of information and are commonly used for data that is to be repeatedly accessed by applications at relatively high frequencies. Generally, data that is frequently accessed is immutably stored in a hashmap structure as key-value pairs. As a data storage structure, hashmaps can require a relatively large memory footprint, particularly in instances of larger volumes of data being stored in a hashmap.

In traditional hashmaps, a first layer of the hashmap is an array and each item in the array is an entry object or linked lists of entry objects. When the hashmap is created, the array is initialized as a table and elements of the array are of a type entry, referred to herein as entry objects. In traditional hashmaps, each entry object is a key-value pair that holds a reference to a next entry object. In this manner, each entry object of the table array serves as a first node of a linked list of entry objects and points to the linked list. The next entry object can be referred to as a linked list hash data structure, which is a combination of an array and a linked list.

Figure 2:
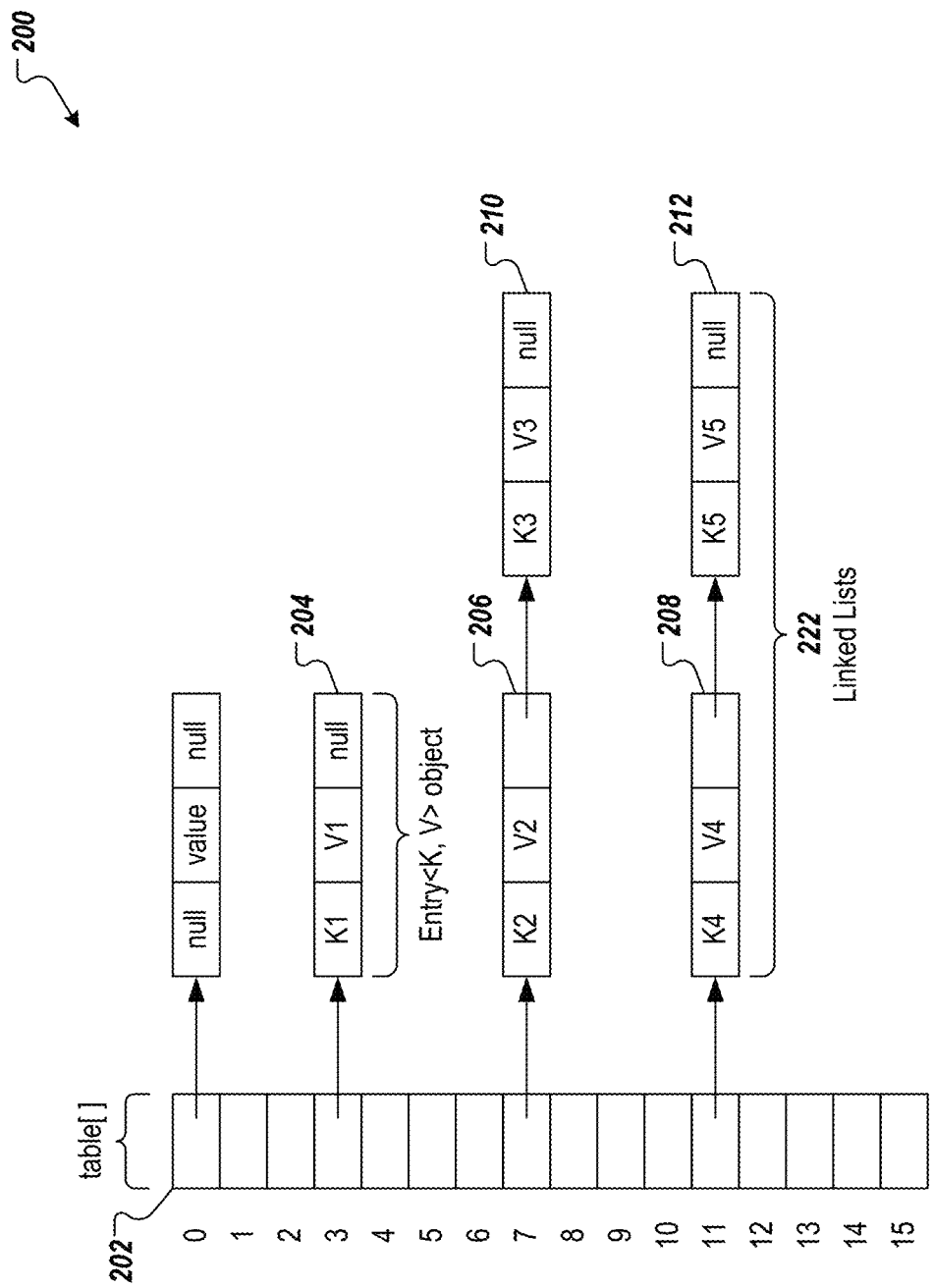
FIG. 2 depicts an example representation of a hashmap in accordance with a traditional approach.

FIG. 2 depicts an example representation of a hashmap 200 in accordance with a traditional approach. The hashmap 200 stores the data in the form of key-value pairs, each key-value pair being stored in an object of an Entry<K, V> class (i.e., entry object) in Java. In some examples, the entry object has multiple fields that include: key (K), value (V), next, and hash. The key field stores the key of the entry object, the value field stores the value of the entry element, the next field stores a pointer to a next key-value pair in a linked list of entry objects, and the hash field stores a hash of the key. The hash of the key is generated by processing the key through a hash function. The entry objects are stored in an array called table[ ] having a particular size. For example, in Java, table[ ] has an initial size of 16 (e.g., 0, . . . , 15).

In the example of FIG. 2, the hashmap 200 includes an array 202 and cells of the array 202 point to entry objects. In the example of FIG. 2, a cell having an index (i) equal to 3 stores a pointer to an entry object 204, a cell having the index (i) equal to 7 stores a pointer to an entry object 206, and a cell having the index (i) equal to 11 stores a pointer to an entry object 208. A next field of the entry object 206 stores a pointer to an entry object 210, and a next field of the entry object 208 stores a pointer to an entry object 212. Accordingly, the entry object 206 and the entry object 210 define a linked list, and the entry object 208 and the entry object 212 define a linked list 222. In general, linked lists result in instances where the hash value of a key collides with (i.e., is equal to) the hash value of another key. For example, in the example of FIG. 2, the hash value of key 2 (K2) is the same as the hash value of key 3 (K3), and the hash value of key 4 (K4) is the same as the hash value of key 5 (K5).

With regard to the size of entry objects in traditional hashmaps, an entry object includes an object header, a member variable, and alignment padding. For 64-bit systems, the object header is 12 bytes and the alignment padding is 4 bytes, while the member variable can vary in size. For example, the member variable can include, by way of non-limiting example, data types of int, long, byte, short, boolean, and reference types of string and date. By way of non-limiting example, the size of the entry object for the key-value pair <"test", 2214> is 32 bytes.

While the size of individual entry objects can seem relatively small (e.g., 32 bytes), hashmaps can store, for example, tens of thousands to millions of entry objects. Collectively, the numerosity of the entry objects occupy a significant amount of memory. This requires infrastructure (e.g., server systems) with sufficient memory to be able to store the hashmaps.

In view of the above context, implementations of the present disclosure provide a low-memory, efficient hashmap. More particularly, the hashmap of the present disclosure is provided as a data structure that is a three-dimensional array to store entry objects. The hashmap of the present disclosure is configured, such that the entry objects stored therein are smaller in size than entry objects of traditional hashmaps. For example, entry objects stored in the hashmap of the present disclosure can be half the size of entry objects stored in traditional hashmaps (e.g., 16 bytes instead of 32 bytes).

FIGS. 3A-3C depict an example visual representation of a low-memory, efficient hashmap 300 in accordance with implementations of the present disclosure. The hashmap 300 is not a fixed array table. Instead, and as described in further detail herein, the hashmap 300 includes a fixed dimension and multiple variable dimensions. Here, the fixed dimension is static as the hashmap 300 is populated, while each variable dimension can increase, while the hashmap is populated.

With particular reference to FIG. 3A, the hashmap 300 includes indices i, j, k, each index corresponding to a respective dimension. The index i represents a fixed dimension having an array size (n), as discussed in further detail herein. The index j and the index k each represent a variable dimension, which can increase as the hashmap 300 is populated. Increase of the variable dimensions is discussed in further detail herein by way of example with reference to FIGS. 4A-4F.

In some examples, the index i indicates a row 302 and the index j indicates a column 304 to locate a cell 306 within a layer 308 that is indicated by the index k. That is, each cell 306 can be located using a respective [i, j, k] tuple. For example, an array location A[i][j][k] identifies a specific cell 306 within the hashmap 300. FIG. 3B depicts a layer 308 (e.g., k=0) in the i-dimension (i index) and the j-dimension (j index). In the example of FIG. 3B, the i index includes six values (i.e., 0, . . . , 5 and the j index includes eight values (i.e., 0, . . . , 7. FIG. 3C depicts a single row (e.g., i=0) and multiple layers 308 in the j-dimension. In the example of FIG. 3C, the k index includes five values (i.e., 0, . . . , 4. It is contemplated however, the each of the i index, the j index, and the k index can include any appropriate number of values, as described in further detail herein.

In some implementations, the number of values in the i index (also referred to as array size) is determined prior to generating the hashmap 300. In some examples, the number of values in the i index is determined based on the size of data that is to be stored to the hashmap. The size of data can be determined from a set of entry objects that are to be stored in the hashmap. Listing 1 provides example code for determining an initial array size (n) for the i index:

---
Listing 1: Example Code to Determine Initial Array Size

```
static final int tableSizeFor (int cap) {
   int n = cap − 1;
   n |= n >>> 1;
   n |= n >>> 2;
   n |= n >>> 4;
   n |= n >>> 8;
   n |= n >>> 16;
   n += 1;
   if (n <= 0)
      throw new IndexOutOfBoundsException
      ("Size too big or
negative");
   return n;
}
```
---

The initial array size corresponds to an array size of a traditional hashmap. In accordance with implementations of the present disclosure, the array size of the index i for the hashmap of the present disclosure is determined as half of the initial array size minus one. For example:

$$n=(n/2)-1$$

To illustrate, a non-limiting example can be considered, in which cap is equal to 100,000. In this example, the initial array size (i.e., the array size for a traditional hashmap) would be provided as 131,072, which is the smallest base 2 number able to accommodate 100,000 records (i.e., 65,536 ($2^{16}$)<100,000<131,072 ($2^{17}$)). In this example, the array size for the hashmap of the present disclosure would be calculated as 65,535. Consequently, the array size n of the hashmap of the present disclosure is one half, minus one of that of a traditional hashmap, which is approximately half as compared to a traditional hashmap storing the same number of data objects.

When the hashmap 300 is initially created, it is absent any data stored therein. Accordingly, the hashmap 300 includes an index i of size n and an index j of size 1 (e.g., j=0) that is initially populated with null. In some examples, the hashmap 300 initially includes an index k of size 1 (e.g., k=0), which is initially populated with null. This is discussed in further detail herein by way of example with reference to FIGS. 4A-4F.

As described in further detail herein, data of each entry object is stored in cells of the hashmap based on multiple hash functions. In some implementations, a first hash function (hash1) and a second hash function (hash2) are used. Example hash functions can include, without limitation, MOM032 and SHA1. It is contemplated, however, that any appropriate hash function can be used. In some examples, the first hash function and the second hash function are different from each other. For example, if the first hash function is MOM032, the second hash function is SHA1. By using different hash functions, a rate of collision between hash values can be reduced to approximately zero.

In some implementations, the hashmap stores a set of data objects. In some examples, a data object is provided as a key-value pair (e.g., key (K), value (V)) and, for each data object, an entry object is determined and is stored in the hashmap. More particularly, for each data object (key-value pair), a unique identifier (UID) is determined using hash1. In some examples, the UID is determined as a hash of the key (K) using hash1. By way of non-limiting example, an example entry object can include [<dog, is, mine>, 123], where K=<dog, is, mine>, and V=123. In this example, the UID can be calculated to be equal to 101 by processing the key <dog, is, mine> through hash1. In some examples, a second identifier (SID) is determined as a hash of the key using hash2. Continuing with the non-limiting example above, a SID can be calculated to be equal to 33 by processing the key <dog, is, mine> through hash2. In some implementations, the entry object of a data object is provided as the UID, the SID, and the value of the data object. Using the example above:

| Data Object | Entry Object |
|---|---|
| [<dog, is, mine>, 123] | [101, 33, 123] |

In some implementations, the number of values in each of the j index and the k index is determined as the hashmap is populated. For example, and as described in further detail herein, for each unique UID to be stored in a particular i index, a j index is provided. In some examples, the j index for each i index initially includes a single index (e.g., j=0). For each i index, the first unique UID encountered is stored at j=0. If another unique UID is encountered, which is also to be stored in the i index, the j index is incremented to j=1, and the other unique UID is stored there. This process repeats for each unique UID encountered for a respective i index. In this manner, the size of the j index for a particular i index can grow as entry objects are stored to the hashmap. Further, the size of the j index can differ as between i indices. For example, after all of the data is stored to the hashmap, a first i index can have a j index of size q and a second i index can have a j index of size r, where q r.

Similarly, the k index for a respective i index, j index pair can grow as data is stored to the hashmap. For example, and as described in further detail herein, for entry objects having the same UID, but different SIDs, the k index is increased. Further, the size of the k index can differ as between i index, j index pairs. For example, after all of the data is stored to the hashmap, a first i index, j index pair can have a k index of size m and a second i index, j index pair can have a k index of size p, where m p.

In accordance with implementations of the present disclosure, the UID, SID, and value for each entry object (key-value pair) is stored in the hashmap. In some implementations, each UID is stored in an initial layer (e.g., k=0) within a cell identified by the i index and the j index (i index, j index pair), each SID is stored in an odd layer (e.g., k=1, 3, 5, . . . ), and each value is stored in an even layer (e.g., k=2, 4, 6, . . . ) immediately following the layer of the respective SID. Here, the initial layer (k=0) is excluded in determining whether the other layers in the k dimension are even or odd. Non-limiting examples of writing the UID, SID, and value of respective entry objects are described with reference to FIGS. 4A-4F.

FIGS. 4A-4F depict example progressions of writing data to the low-memory, efficient hashmap of the present disclosure. Initially, before storing any data to the hashmap, an array 400 of the i index is provided. In the examples of FIGS. 4A-4F, the size of the array 400 is 7 (i.e., i=0, . . . , 6). In some examples, the j index and the k index are each of size 1 and populated with null, but grow as data is stored to the hashmap.

For example, a first key-value pair that is to be stored in the hashmap can include (<dog, is, mine>, 123), with a UID of 101 and a SID of 33. In some examples, the i index for the key-value pair is determined using a modulo function. For example, the i index of the key-value pair is determined as the UID modulo array size (e.g., i=UID mod n). In the example of FIGS. 4A-4F, it is determined that i=1 for the UID of 101.

In some examples, it is determined whether data is stored for the i index of i=1. That is, it is determined whether the i index of i=1 is empty (null). For example, it can be determined whether A[i] is null, where A indicates a location within the hashmap. For the first key-value pair to have data stored in the hashmap, all of the i indices are empty (null). If the i index is empty, a 1×3-dimensional array for a first j index is instantiated and a pointer is set to point to the array. Listing 2 provides example code for instantiating the multi-dimensional array:

$A[i]=\text{new int}[1][3]$

Listing 2: Example Code to Instantiate 1×3 Array for Index i

The UID, the SID, and the value of the key-value pair are stored in the hashmap. For example, the UID is stored at A[i][0][0], the SID is stored at A[i][0][1], and the value is stored at A[i][0][2].

Figure 4A:
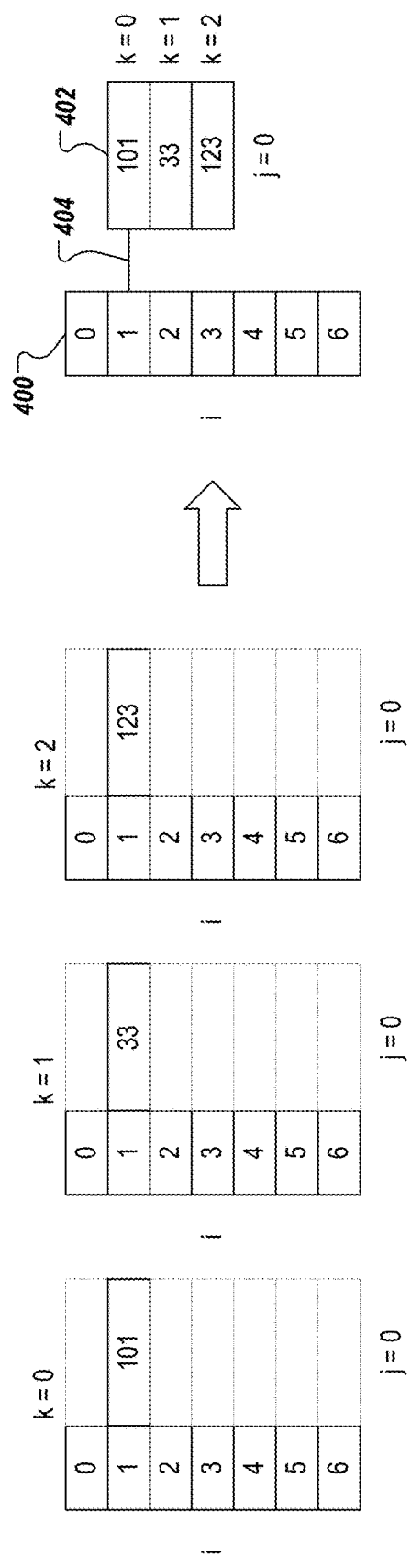
FIGS. 4A-4F depict example progressions of writing data to the low-memory, efficient hashmap of the present disclosure.
Figure 4B:
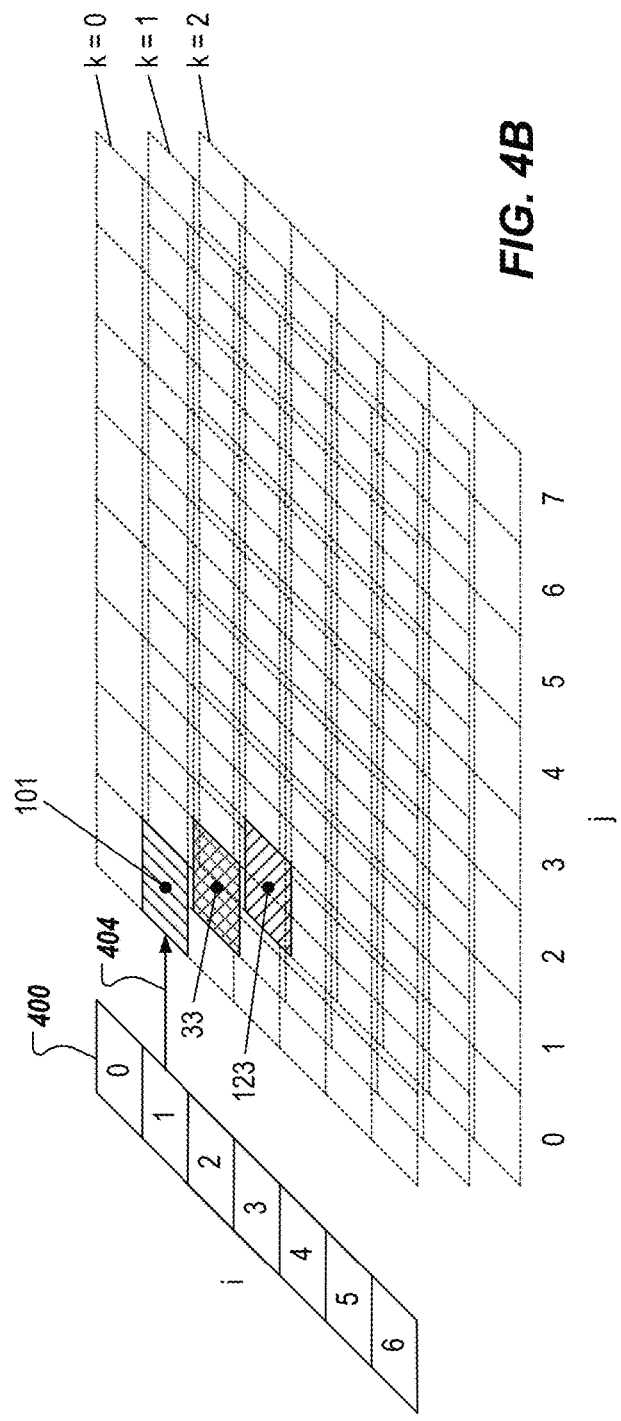

For purposes of illustration, and continuing with the example above, it is determined that A[1] is null (i=1). In response, an array 402 is instantiated for i=1 (e.g., A[1]=new int [1] [3]) and the UID, the SID, and the value are stored in the hashmap. For example, and as depicted in FIG. 4A, 101 (the UID) is stored at A[1][0][0], 33 (the SID) is stored at A[1][0][1], and 123 (the value) is stored as A[1][0][2]. This is visually depicted in FIG. 4B, in which only three cells within the hashmap exist at this point in time and are populated as described above with reference to FIG. 4A.

In some implementations, the UID, the SID, and the value of each entry object (key-value pair) that is to be stored in the hashmap are incrementally stored. For example, for a next key-value pair, an i index is determined, as described above (e.g., i=UID mod n). If the i index is empty, an array is instantiated and the UID, the SID, and the value are stored as described above. If the i index is not empty, it is determined whether the UID stored in the first entry that the i index points to (e.g., at A[i][j][0], where j=0) is equal to the UID of the entry object that is to be stored (the current entry object). If the UIDs are not equal, the next j index (j=j+1) is checked to determine whether it is empty (e.g., A[i][j][0]=null, where j=1). If the next j index is empty, a 1×3-dimensional array for the j index is instantiated and the UID, the SID, and the value of the current entry object are stored (e.g., the UID is stored at A[i][j][0], the SID is stored at A[i][j][1], and the value is stored at A[i][j][2]).

If the next j index is not empty, it is determined whether the UID stored in the next j index entry (e.g., at A[i][j][0]) is equal to the UID of the current entry object. If the UIDs are not equal, the j index is incremented to a next j index and the process repeats. That is, the j index is incrementally checked until either a next j index is empty (at which point the UID, SID, and value of the entry object are stored, as discussed above), or the UIDs are determined to be equal, as discussed below.

Figure 4C:
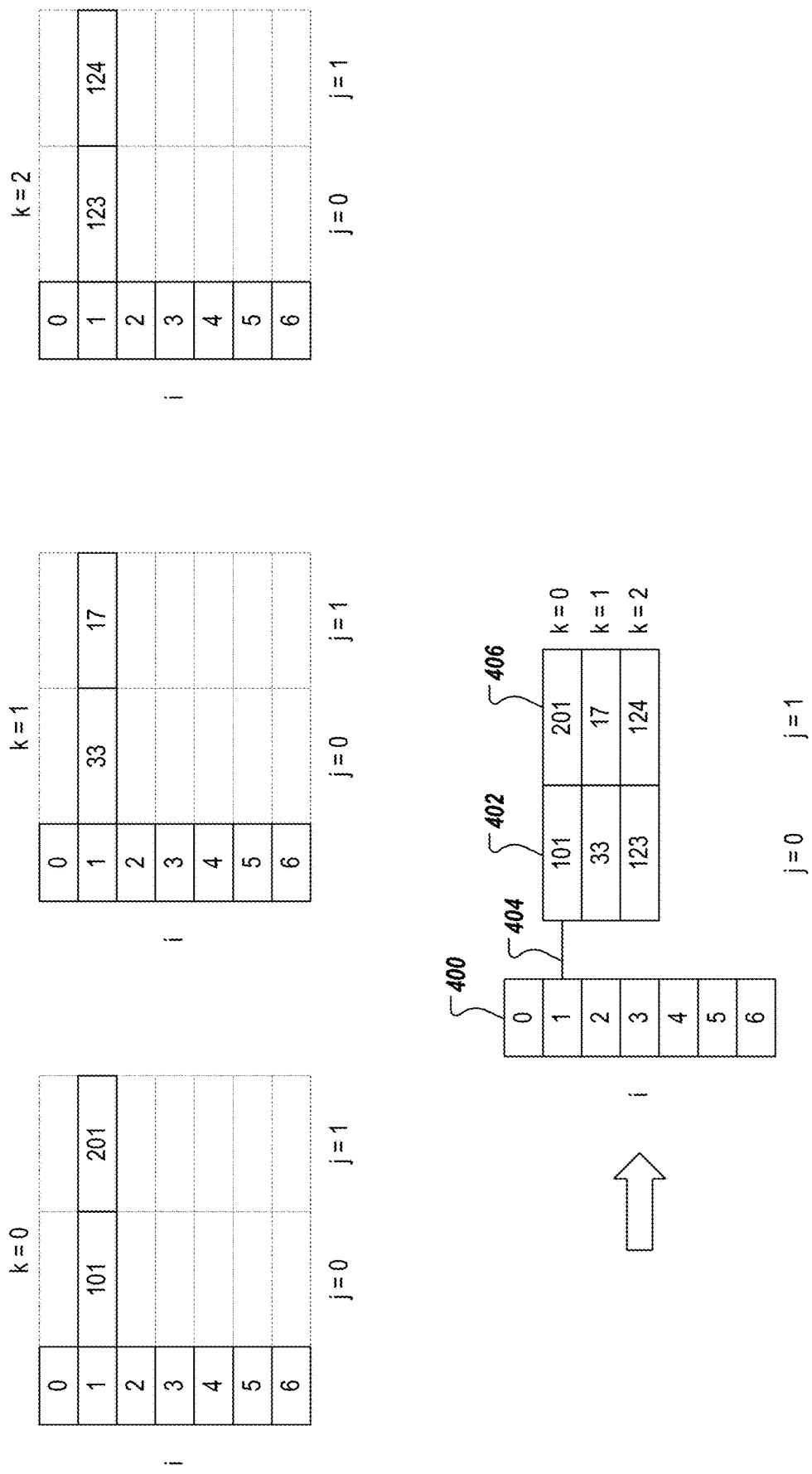

To illustrate this, and with reference to FIG. 4C, an entry object can be considered that is determined to have a UID of 201, a SID of 17, and a value of 124. In the example of FIG. 4C, the i index for the entry object can be determined to be equal to 1 (e.g., UID mod n=1), which is the same i index as the entry object discussed with reference to FIGS. 4A and 4B (the previously stored entry object). In the example of FIG. 4C, it is determined that the i index is not empty (e.g., because the UID 101 of the previously stored entry object is stored at A[1][0][0]). In response, the j index is set equal to 0. It is determined that the UIDs are not equal. In response, the j index is incremented, such that j=1, and it is determined that the hashmap entry (i.e., A[1][1][0]) is empty. Consequently, a 1×3-dimensional array 406 for the j=1 index is instantiated and the UID, the SID, and the value of the current entry object are stored. That is, and as depicted in FIG. 4C, (e.g., 201 is stored at A[1][1][0], 17 is stored at A[1][1][1], and 124 is stored at A[1][1][2].

If the UIDs (i.e., the UID stored at the j index and the UID of the current entry object) are equal, a collision has occurred. That is, two entry objects (a stored entry object and the current entry object) collide in that they have the same UID. In this case, the k index is set equal to 1 and the SIDs are compared (i.e., the SID of the stored entry object and the SID of the current entry object). More particularly, it is determined whether the SID stored in the k index entry (e.g., at A[i][j][k], where k=1) is equal to the SID of the current entry object. If the SIDs are equal, the current entry object and the stored entry object are the same (e.g., the data set to be stored in the hashmap includes multiple copies). In some examples, if the SIDs are equal, the k index is again incremented and the value of the current entry object is stored (e.g., at A[i][j][k]) overwriting the existing value stored in the hashmap.

If the SIDs are not equal, the k index is incremented by two to a next k index and it is determined whether the next k index is empty (null). If the next k index is empty, the SID of the current entry object is stored in the next k index and the value of the current entry object is stored in a next next k index (i.e., the k index is incremented again to store the value). More plainly stated, the SID is stored at A[i][j][k] and the value is stored at A[i][j][k+1]. However, if the next k index is not empty, it is determined whether the SID stored in the next k index entry (e.g., at A[i][j][k], where k=3) is equal to the SID of the current entry object. This process repeats until the SID and value are stored, or it is determined that the current entry object is redundant to a stored entry object (e.g., and the value of the current entry object overwrites the value of the stored entry object).

Figure 4D:
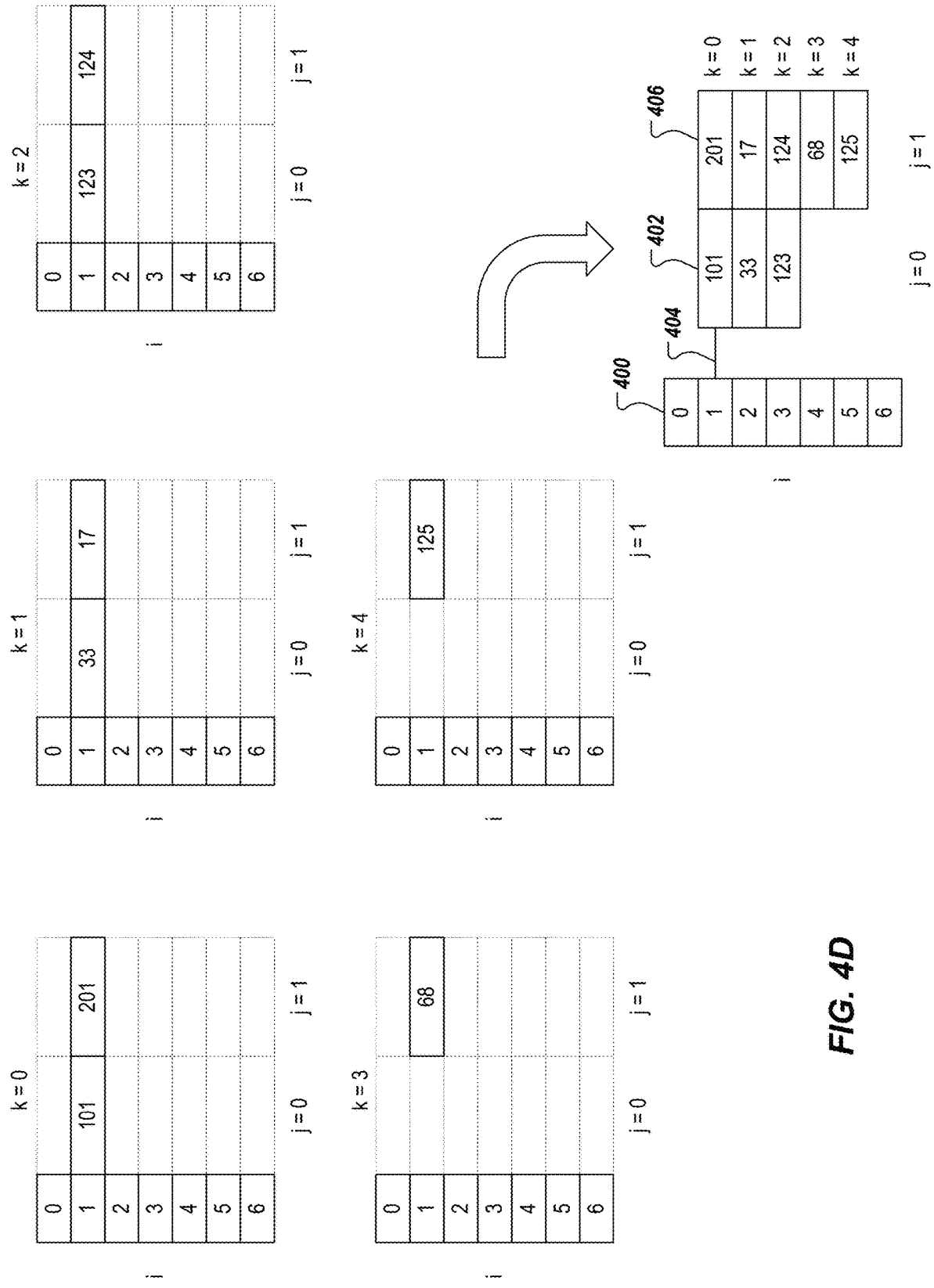

To illustrate this, and with reference to FIG. 4D, an entry object can be considered (current entry object) that is determined to have a UID of 201, an SID of 68, and a value of 125. In this example, the UID 201 of the current entry object is equal to the UID of a previously stored entry object, discussed with reference to FIG. 4C. In the example of FIG. 4D, the i index for the entry object can be determined to be equal to 1 (e.g., UID mod n=1), which is the same i index as the entry objects discussed with reference to FIGS. 4A-4C (the previously stored entry objects). In the example of FIG. 4D, it is determined that the i index is not empty (e.g., because the UIDs 101, 201 of the previously stored entry objects are stored in the hashmap for the i index). In response, the j index is set equal to 0.

It is determined that the UID 101 stored at A[1][0][0] is not equal to the UID 201. In response, the j index is incremented, such that j=1, and it is determined that the next hashmap entry is not empty (i.e., because the UID 201 is stored at A[1][1][0]). It is determined that the UIDs are equal. That is, the UID 201 stored at A[1][1][0] is equal to the UID 201 of the current entry object. In response, the k index is set equal to 1, and it is determined whether the SIDs are equal. In the example of FIG. 4D, the SIDs are not equal. Consequently, the k index is incremented by 2 to k=3, and it is determined that the k index is empty. In response, the array of the j index and k index is extended by two, the SID is stored at the k index and the value is stored at the k+1 index. That is, and as depicted in FIG. 4D, 68 is stored at A[1][1][3], and 125 is stored at A[1][1][4].

Figure 4E:
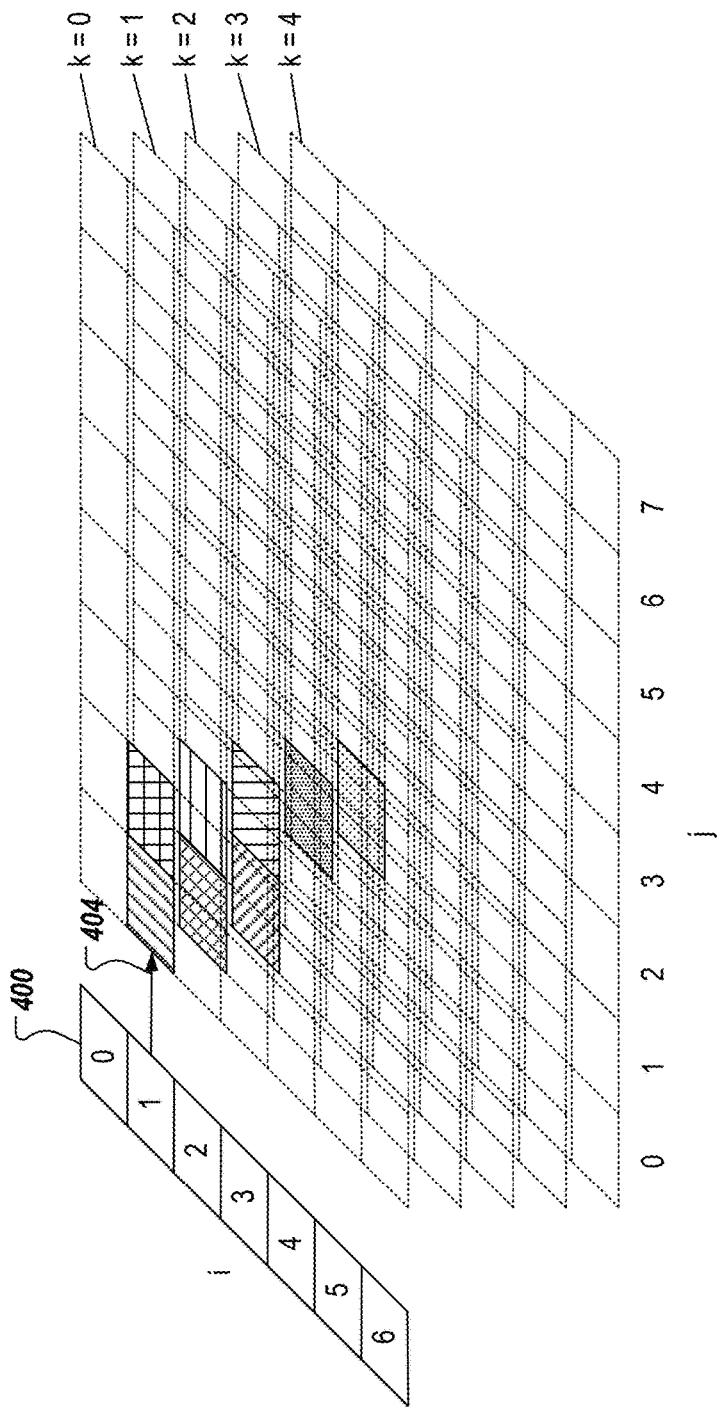
Figure 4F:
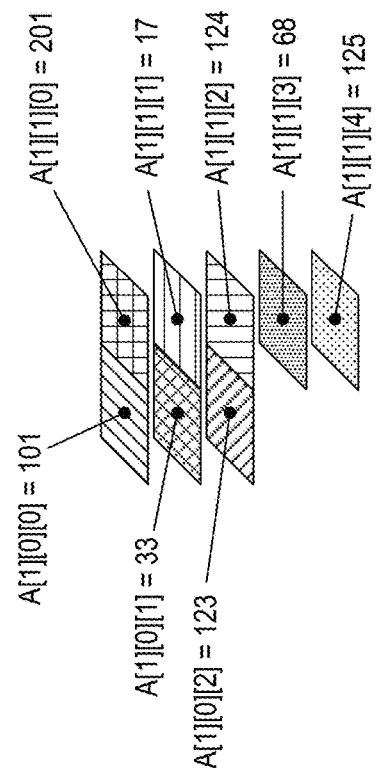

FIGS. 4E and 4F visually depict storage of the entry objects as described herein with reference to FIGS. 4A-4D.

Figure 5:
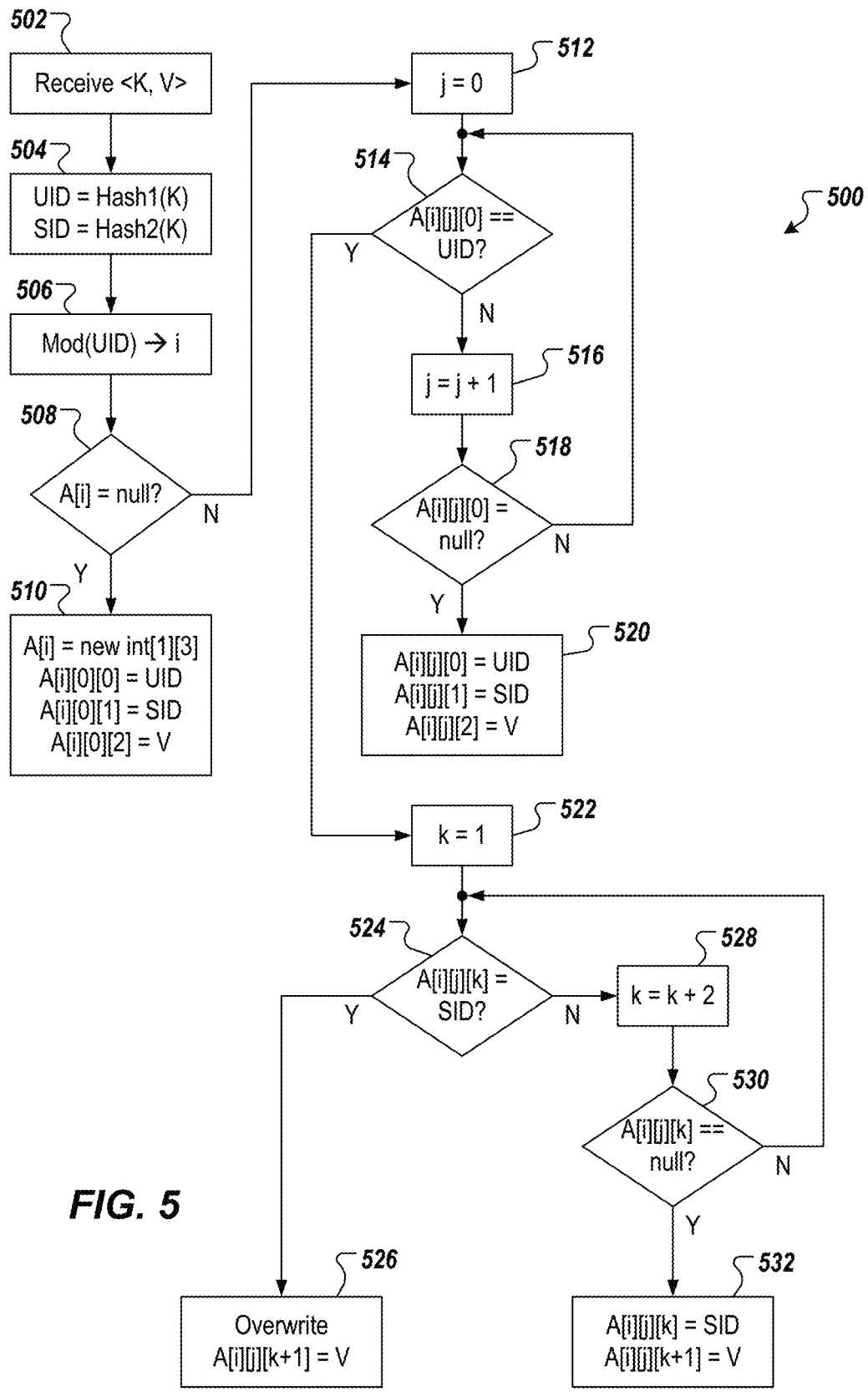
FIGS. 5 and 6 depict example processes that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices. The example process 500 can be executed to generate a low-memory hashmap that stores data associated with a set of data objects in accordance with implementations of the present disclosure. In some examples, the example process 500 is executed for each data object in the set of data objects. In some examples, prior to execution of the example process 500 for a first data object, the hashmap is instantiated starting with an array of index i having an array size n, as described herein (e.g., for 100,000 data objects, n=65,535).

A data object having a key-value pair <K, V> is received (500). A UID and a SID for the key-value pair are determined (504). For example, and as described herein, the key K can be processed through a first hash function (hash1) to determine the UID and the key K can be processed through a second hash function (hash2) to determine the SID. Accordingly, an entry object for the data object is provided, the entry object including [UID, SID, V]. Here, the data object that is received can be referred to as a to be stored entry object and/or a current entry object.

An i index for the current entry object is determined based on the UID (506). For example, the i index is determined as i=UID mod n. It is determined whether the index i is empty (508). For example, it is determined whether the i index points to an array. In other words, it is determined whether any entry objects have been previously stored for the i index. If the index i is empty, an array is instantiated for the i index and the UID, the SID, and the V are stored (510). For example, a 1×3 array is instantiated for j=0, and the UID is stored in A[i][j][0], the SID is stored in A[i][j][1], and the value is stored in A[i][j][2].

If the i index is not empty, the j index is set equal to zero (512) and it is determined whether a UID stored in A[i][j][0] is equal to the UID of the current entry object (514). If the UID stored in A[i][j][0] is not equal to the UID of the current entry object the j index is incremented by 1 (516) and it is determined whether A[i][j][0] is null (518). If A[i][j][0] is not null, the example process 500 loops back to determine whether a UID stored in A[i][j][0] is equal to the UID of the current entry object (514). If A[i][j][0] is not null, an array is instantiated for the j index and the UID, the SID, and the V are stored (520). For example, a 1×3 array is instantiated for j=1, and the UID is stored in A[i][j][0], the SID is stored in A[i][j][1], and the value is stored in A[i][j][2].

If the UID stored in A[i][j][0] is equal to the UID of the current entry object (as determined at (514)), the k index is set equal to 1 (522). It is determined whether a SID stored in A[i][j][k] is equal to the SID of the current entry object (524). If the SID stored in A[i][j][k] is equal to the SID of the current entry object, the value V is stored in A[i][j][k+1], overwriting a previously stored value V (526). If the SID stored in A[i][j][k] is not equal to the SID of the current entry object, the k index is incremented by 2 and it is determined whether A[i][j][k] is null (530). If A[i][j][k] is not null, the example process 500 loops back to determine whether the SID stored in A[i][j][k] is equal to the SID of the current entry object (524). If A[i][j][k] is null, the array of the j index is extended by two in the k-dimension and the SID and the value V are stored. For example, the SID is stored in A[i][j][k] and the value V is stored in A[i][j][k+1].

In accordance with implementations of the present disclosure, the hashmap is immutable. More particularly, after all UIDs, SIDs, and values of data objects of a set of data objects are stored in the hashmap, the hashmap is locked from being written to. That is, the hashmap does not change.

Figure 6:
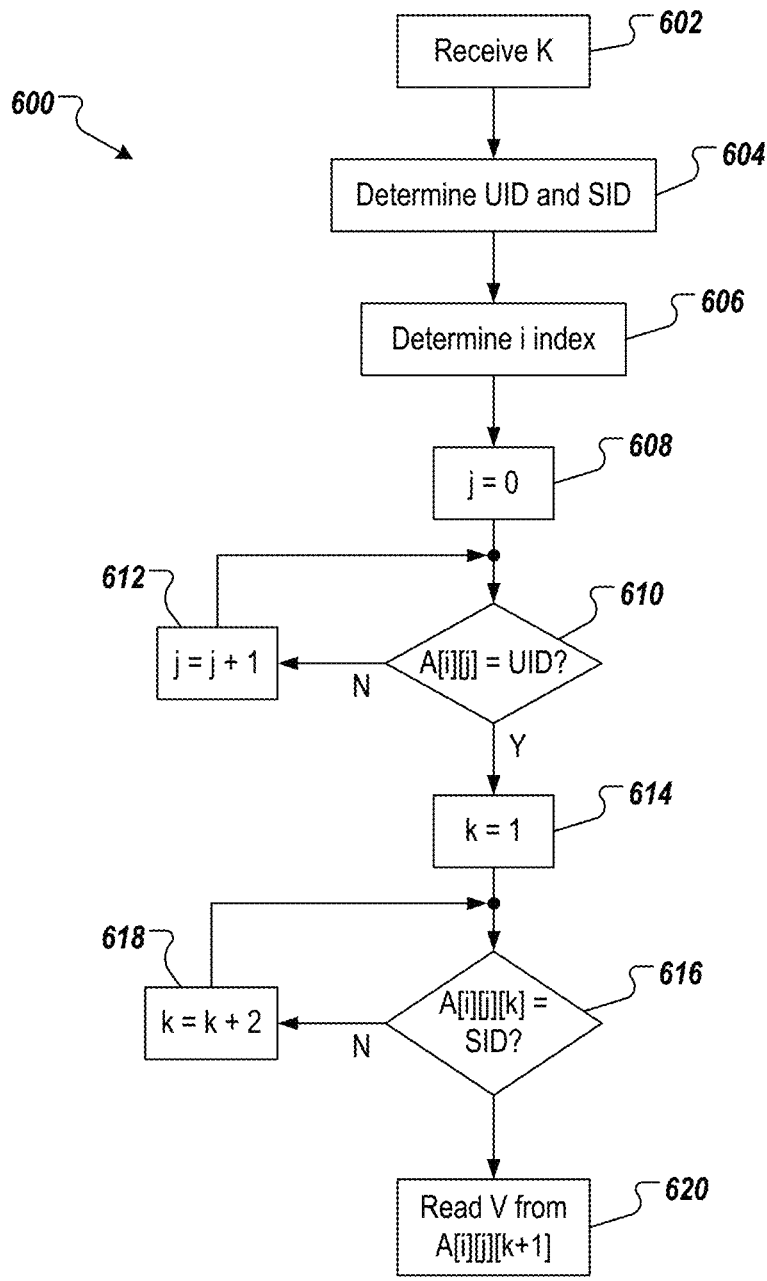

FIG. 6 depicts an example process 600 that can be executed in accordance with implementations of the present disclosure. In some examples, the example process 600 is provided using one or more computer-executable programs executed by one or more computing devices. The example process 600 can be executed to read data from a low-memory hashmap in accordance with implementations of the present disclosure.

A key K is received (602). For example, the key K of a data object is received (e.g., from an application) and the value V that corresponds to the key K is to be retrieved from the hashmap. A UID and a SID are determined (604). For example, and as described herein, the key K can be processed through a first hash function (hash1) to determine the UID and the key K can be processed through a second hash function (hash2) to determine the SID. An i index is determined (606). For example, the i index is determined as i=UID mod n. The j index and the k index are each set equal to 0 (608).

It is determined whether a UID stored in A[i][j] is equal to the UID (610). For example, the UID stored in A[i][j] is read and is compared to the UID of the key K. If the UID stored in A[i][j] is not equal to the UID, the j index is incremented by 1 (612) and the example process 600 loops back. If the UID stored in A[i][j] is equal to the UID, the k index is set equal to 1 (614). It is determined whether a SID stored in A[i][j][k] is equal to the SID (616). For example, the SID stored in A[i][j][k] is read and is compared to the SID of the key K. If the SID stored in A[i][j][k] is not equal to the SID, the k index is incremented by 2 (618) and the example process 600 loops back. If the SID stored in A[i][j] is equal to the SID, a value V is read from A[i][j][k+1] (620). The value V is returned (e.g., to an application) in response to receipt of the key K.

Implementations of the present disclosure provide one or more technical advantages. An example advantage is that implementations of the present disclosure provide a more compact hashmap as compared to traditional hashmaps. In some examples, for a given set of data objects, the hashmap of the present disclosure can be approximately 50% smaller than a traditional hashmap. For example, and as discussed above, entry objects of the present disclosure can be approximately half the size of entry objects of traditional approaches (e.g., 16 bytes as opposed to 32 bytes). In this manner, an amount of memory required to store a hashmap of the present disclosure is significantly less than the amount of memory required to store a traditional hashmap. As another example advantage, implementations of the present disclosure achieve memory reduction without negatively impacting performance. For example, reading data from both the traditional hashmap and the hashmap of the present disclosure can be achieved with a time complexity of O(1) (constant time). Consequently, the hashmap of the present disclosure achieves significant memory reduction, while maintaining the same time complexity of O(1).

Figure 7:
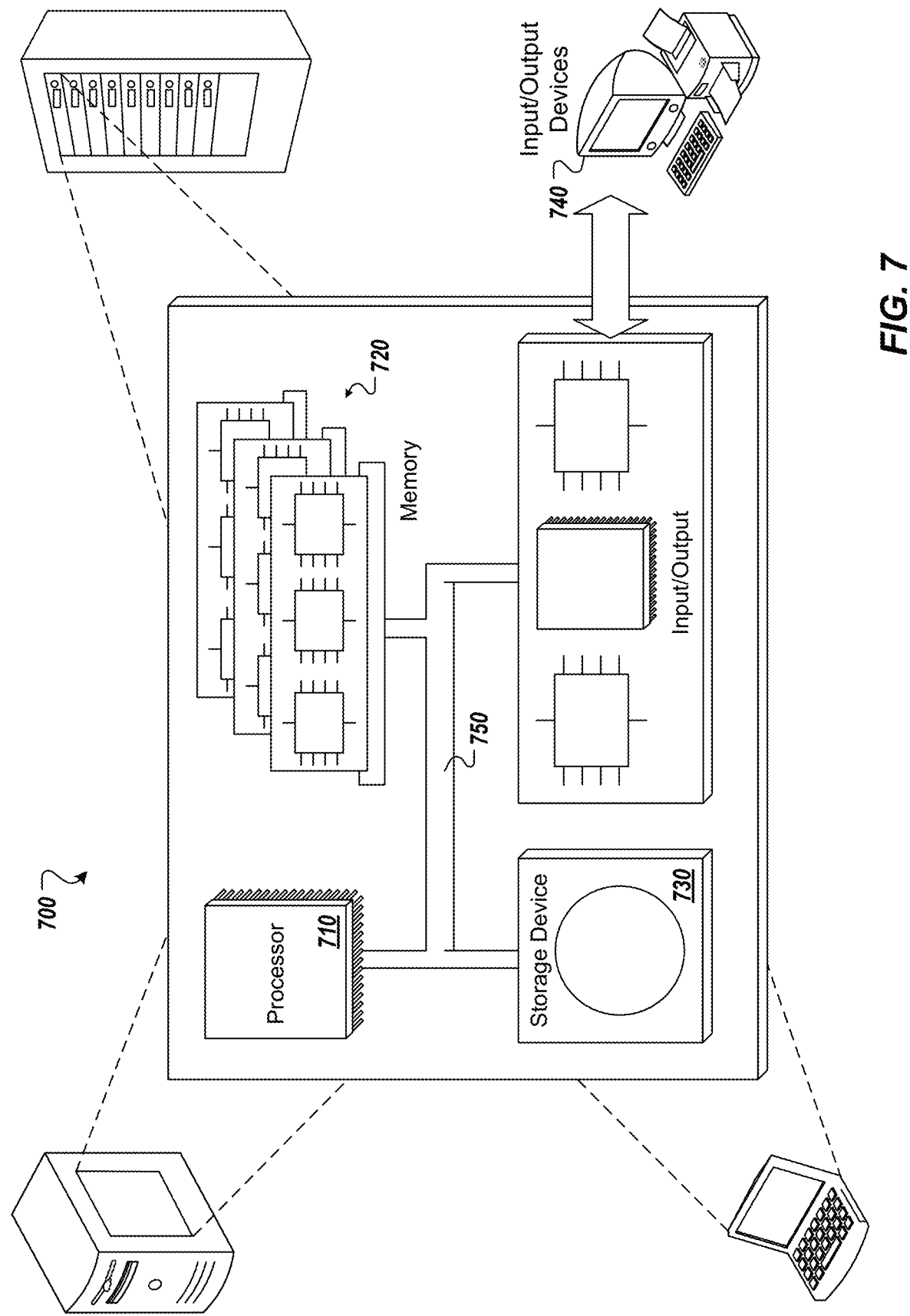
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations thereof. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for provisioning a hashmap that stores data of data objects in a set of data objects, the method being executed by one or more processors and comprising:
   receiving a key and a value of a data object in the set of data objects;
   determining a first identifier and a second identifier of the data object based on the key;
   defining an entry object for the data object, the entry object comprising the first identifier, the second identifier, and the value of the data object; and
   storing the entry object in the hashmap by:
      determining a first value of a first index based on the first identifier,
      determining a second value of a second index to provide a first value and second value pair that at least partially defines a first location within the hashmap storing the first identifier,
      determining a third value of a third index for the first value and second value pair, where the first value, the second value, and the third value define a second location within the hashmap storing the second identifier, and
      storing the value of the data object at a third location within the hashmap, the third location being defined by the first value, the second value, and an increment of the third value.

2. The method of claim 1, wherein the first identifier is determined by processing the key through a first hash function and the second identifier is determined by processing the key through a second hash function, the first hash function different from the second hash function.

3. The method of claim 1, wherein the second index comprises an array in a dimension of the third index, and second identifiers are stored at odd locations and values are stored at even locations along the dimension, excluding an initial location of the third index.

4. The method of claim 1, wherein the first location within the hashmap storing the first identifier is defined by a tuple comprising the first value, the second value, and an initial value of the third index.

5. The method of claim 1, further comprising reading the value of the data object from computer-readable memory by:
   receiving the key of the data object;
   calculating the first identifier and the second identifier based on the key;
   determining the third location based on the first identifier and the second identifier; and
   reading the value from the third location.

6. The method of claim 1, wherein the increment of the third value is determined by incrementing the third value by 1.

7. The method of claim 1, wherein a size of the first index is determined by providing an initial array size, dividing the initial array size in half, and subtracting one to provide the size of the first index.

8. A non-transitory computer-readable storage medium coupled to one or more processors and having instructions stored thereon which, when executed by the one or more processors, cause the one or more processors to perform operations for provisioning a hashmap that stores data of data objects in a set of data objects, the operations comprising:
   receiving a key and a value of a data object in the set of data objects;
   determining a first identifier and a second identifier of the data object based on the key;
   defining an entry object for the data object, the entry object comprising the first identifier, the second identifier, and the value of the data object; and
   storing the entry object in the hashmap by:
      determining a first value of a first index based on the first identifier,
      determining a second value of a second index to provide a first value and second value pair that at least partially defines a first location within the hashmap storing the first identifier,
      determining a third value of a third index for the first value and second value pair, where the first value, the second value, and the third value define a second location within the hashmap storing the second identifier, and
      storing the value of the data object at a third location within the hashmap, the third location being defined by the first value, the second value, and an increment of the third value.

9. The non-transitory computer-readable storage medium of claim 8, wherein the first identifier is determined by processing the key through a first hash function and the second identifier is determined by processing the key through a second hash function, the first hash function different from the second hash function.

10. The non-transitory computer-readable storage medium of claim 8, wherein the second index comprises an array in a dimension of the third index, and second identifiers are stored at odd locations and values are stored at even locations along the dimension, excluding an initial location of the third index.

11. The non-transitory computer-readable storage medium of claim 8, wherein the first location within the hashmap storing the first identifier is defined by a tuple comprising the first value, the second value, and an initial value of the third index.

12. The non-transitory computer-readable storage medium of claim 8, wherein operations further comprise reading the value of the data object from computer-readable memory by:

receiving the key of the data object;

calculating the first identifier and the second identifier based on the key;

determining the third location based on the first identifier and the second identifier; and reading the value from the third location.

13. The non-transitory computer-readable storage medium of claim 8, wherein the increment of the third value is determined by incrementing the third value by 1.

14. The non-transitory computer-readable storage medium of claim 8, wherein a size of the first index is determined by providing an initial array size, dividing the initial array size in half, and subtracting one to provide the size of the first index.

15. A system, comprising:

a computing device; and a computer-readable storage device coupled to the computing device and having instructions stored thereon which, when executed by the computing device, cause the computing device to perform operations for provisioning a hashmap that stores data of data objects in a set of data objects, the operations comprising:

receiving a key and a value of a data object in the set of data objects;

determining a first identifier and a second identifier of the data object based on the key;

defining an entry object for the data object, the entry object comprising the first identifier, the second identifier, and the value of the data object; and storing the entry object in the hashmap by:

determining a first value of a first index based on the first identifier, determining a second value of a second index to provide a first value and second value pair that at least partially defines a first location within the hashmap storing the first identifier, determining a third value of a third index for the first value and second value pair, where the first value, the second value, and the third value define a second location within the hashmap storing the second identifier, and storing the value of the data object at a third location within the hashmap, the third location being defined by the first value, the second value, and an increment of the third value.

16. The system of claim 15, wherein the first identifier is determined by processing the key through a first hash function and the second identifier is determined by processing the key through a second hash function, the first hash function different from the second hash function.

17. The system of claim 15, wherein the second index comprises an array in a dimension of the third index, and second identifiers are stored at odd locations and values are stored at even locations along the dimension, excluding an initial location of the third index.

18. The system of claim 15, wherein the first location within the hashmap storing the first identifier is defined by a tuple comprising the first value, the second value, and an initial value of the third index.

19. The system of claim 15, wherein operations further comprise reading the value of the data object from computer-readable memory by:

receiving the key of the data object;

calculating the first identifier and the second identifier based on the key;

determining the third location based on the first identifier and the second identifier; and reading the value from the third location.

20. The system of claim 15, wherein the increment of the third value is determined by incrementing the third value by 1.

* * * * *